United States Patent
Van Dyk et al.

(10) Patent No.: US 12,479,768 B2
(45) Date of Patent: Nov. 25, 2025

(54) METHOD, APPARATUS AND COMPOSITION FOR SEALING OF SURFACES

(71) Applicants: Relborgn Pty Ltd, Bibra Lake (AU); Triomviri Pty Ltd, Bibra Lake (AU)

(72) Inventors: Deon Van Dyk, Perth (AU); Nico Johan Grobler, Kensington (AU)

(73) Assignees: RELBORGN PTY LTD, Western (AU); TRIOMVIRI PTY LTD, Western (AU)

( * ) Notice: Subject to any disclaimer, the term of this patent is extended or adjusted under 35 U.S.C. 154(b) by 572 days.

(21) Appl. No.: 17/049,494

(22) PCT Filed: Apr. 30, 2019

(86) PCT No.: PCT/AU2019/050390
§ 371 (c)(1),
(2) Date: Oct. 21, 2020

(87) PCT Pub. No.: WO2019/210359
PCT Pub. Date: Nov. 7, 2019

(65) Prior Publication Data
US 2021/0246070 A1    Aug. 12, 2021

(30) Foreign Application Priority Data

May 2, 2018    (AU) .............................. 2018901473

(51) Int. Cl.
*C04B 41/63*  (2006.01)
*C04B 24/24*  (2006.01)
(Continued)

(52) U.S. Cl.
CPC .............. *C04B 28/26* (2013.01); *C04B 24/24* (2013.01); *C04B 26/02* (2013.01); *C04B 40/065* (2013.01);
(Continued)

(58) Field of Classification Search
CPC ......... C04B 40/065; C04B 2111/00293; C04B 28/26; C04B 24/24; C04B 26/02; C04B 41/009; C04B 41/63; C04B 41/48
See application file for complete search history.

(56) References Cited

U.S. PATENT DOCUMENTS 4,287,242 A * 9/1981 Monden ................. C08L 95/005
427/427.4
5,674,313 A * 10/1997 Aoyama .................. C08K 5/42
106/10

(Continued)

FOREIGN PATENT DOCUMENTS

JP       01218666 A  *  8/1989
JP         317308 A      1/1991
(Continued)

OTHER PUBLICATIONS

Criddle, Alan, Internatonal Search Report from International Application No. PCT/AU2019/050390, Jul. 29, 2019, pp. 1-7, Australian Patent Office, Woden Act 2606, Australia.
(Continued)

*Primary Examiner* — Nathan H Empie
(74) *Attorney, Agent, or Firm* — Ballard Spahr LLP

(57) ABSTRACT

A method for sealing of surfaces comprising the steps of: (a) supplying a first grouting composition; (b) introducing a second component to said first grouting composition to form a third grouting composition; and (c) forming a sealing barrier on a surface from said third grouting composition.

13 Claims, 5 Drawing Sheets

(51) Int. Cl.
*C04B 26/02* (2006.01)
*C04B 28/26* (2006.01)
*C04B 40/06* (2006.01)
*C04B 41/00* (2006.01)
*C04B 41/48* (2006.01)
*C04B 103/12* (2006.01)
*C04B 103/14* (2006.01)
*C04B 103/60* (2006.01)
*C04B 111/00* (2006.01)
*C04B 111/70* (2006.01)

(52) U.S. Cl.
CPC ............ *C04B 41/009* (2013.01); *C04B 41/48* (2013.01); *C04B 41/63* (2013.01); *C04B 2103/12* (2013.01); *C04B 2103/14* (2013.01); *C04B 2103/605* (2013.01); *C04B 2111/00293* (2013.01); *C04B 2111/70* (2013.01)

(56) References Cited

U.S. PATENT DOCUMENTS 5,961,437 A   10/1999   Smith et al.

2003/0116749 A1 *  6/2003  Suren ..................... E01C 7/353
                                                    106/13
2007/0224362 A1   9/2007  Briand et al.
2015/0167269 A1   6/2015  Van Dyk et al.

FOREIGN PATENT DOCUMENTS

| JP | 3147919 A | 6/1991 | |
| JP | H0656126 U * | 8/1994 | |
| JP | 8120181 A | 5/1996 | |
| JP | 1094770 A | 4/1998 | |
| WO | WO-0196710 A1 * | 12/2001 | ........... E21D 11/105 |
| WO | 2012146958 A1 | 11/2012 | |
| WO | WO-2014009298 A2 * | 1/2014 | ............ C04B 16/04 |

OTHER PUBLICATIONS

Criddle, Alan, Written Opinion from International Application No. PCT/AU2019/050390, Jul. 29, 2019, pp. 1-7, Australian Patent Office, Woden Act 2606, Australia.

* cited by examiner

METHOD, APPARATUS AND COMPOSITION FOR SEALING OF SURFACES

CROSS REFERENCE TO RELATED APPLICATIONS

This is a U.S. National Phase Application of International Application No. PCT/AU2019/050390, filed Apr. 30, 2019, entitled "Method, Apparatus and Composition for Sealing of Surfaces" which claims priority to Australian application No. 2018901473, filed May 2, 2018. The content of each of the aforementioned applications is hereby incorporated by reference in its entirety.

FIELD OF THE INVENTION

This invention relates to a method, apparatus and composition for sealing of surfaces, for example surface locations exposed to corrosion or weathering by environmental factors such as climate (e.g. frosts, wind and precipitation) and ultraviolet radiation.

BACKGROUND TO THE INVENTION

The Applicant has long been involved in developing methods to substantially seal or otherwise reduce the permeability of a matrix such as concrete, rock or soil in the context of a range of sealing applications, from mining applications through to civil engineering applications such as the repair of tunnels. Such methods typically involve latex based sealing compositions.

The Applicant's Australian Patent No. 739427 discloses a method of sealing a passage in a body such as a geological formation with a seal composition comprising delivering under pressure into the passage an admixture of latex and one or more of the following components: a friction resistant material, an extreme pressure additive; and a plasticiser, these components in total being present in quantities not greater than about 1% by weight of the mixture. The components may typically include organic and/or inorganic origin viscosity enhancing materials, detergents and/or soap.

The Applicant's Australian Patent No. 2009253842 discloses a method of sealing a passage in a body with a sealing composition comprising (a) a major proportion of a latex emulsion or colloid; and (b) a minor proportion of lauric acid or laurate compound; and (c) at least one further selected additive, ideally a latex coagulation inhibitor, wherein the sealing composition is pumped into the passage where it is set or coagulated to form a seal.

The Applicant's Australian Patent No. 2013266018 discloses a method of limiting or reducing permeability of a matrix to liquid or gas flow including the steps of measuring one or more parameters relating to the matrix and selecting one or more components of a multi-component sealing composition with reference to the measured parameters.

The Applicant's International Application No. PCT/AU2018/050198 filed 5 Mar. 2018 and the contents of which are hereby incorporated herein by reference discloses a sealing composition resistant to ionising radiation.

The applications described above do not typically expose the latex sealing composition to ultraviolet radiation which is lower energy, and different to, ionising radiation. Extension of the Applicant's sealing technology to applications involving weathering by exposure to ultraviolet radiation, such as sealing of structures exposed to sunlight, will need to address this issue. Sealing compositions, particularly of polymeric nature such as the Applicant's latex based compositions, are subject to degradation by ultraviolet radiation which proceeds through a chain reaction involving steps of chain initiation, chain propagation, chain branching and chain termination.

Although the previous discussion alludes to weathering by ultraviolet radiation, it will be understood that other weathering mechanisms, including the previously mentioned climatic weathering mechanisms, and corrosion can be addressed by applying sealing compositions to form protective layer(s) on surfaces.

It is an object of the present invention to provide a method, apparatus and composition for sealing surface(s) to address corrosion and/or weathering by environmental factors including climatic weathering factors as previously discussed and/or ultraviolet radiation degradation.

SUMMARY OF THE INVENTION

With this object in view, the present invention provides a method for sealing of surfaces comprising the steps of:
(a) supplying a first grouting composition;
(b) introducing a second component to said first grouting composition to form a third grouting composition; and
(c) forming a sealing barrier on a surface from said third grouting composition.

The first grouting composition may be selected from a range of grouts with less flexibility than polymeric latexes. Such grouting compositions may include sodium silicate and/or other mineral based grouts. Cement or cementitious compositions, such as ordinary Portland Cement (OPC), are also suitable. Such grouting compositions are typically significantly more resistant to UV radiation than polymeric latexes. However, their typically low to absent flexibility makes sealing barriers formed from them more susceptible to weathering caused by expansion/contraction phenomena or wind erosion.

The second component may be an additive, such as an additive that will increase flexibility of the sealing barrier formed from said third grouting composition in comparison to a sealing barrier formed from said first grouting composition alone. Such additive may include an elastomeric polymer or polymer based emulsion, such as a latex based emulsion whether natural or synthetic, that forms—if necessary following curing as described for example in the Applicant's Australian Patent No. 739427 incorporated herein by reference—a flexible sealing barrier. The additive could also be a UV inhibitor or another agent resistant to the environmental weathering factors that the sealing barrier will be subjected to in service. The second component may include a plurality of additives including, for example, the additive for increasing flexibility of the sealing barrier and the UV inhibitor. Other combinations are possible. Desirably, interactions between such additives should not substantially reduce the resistance to environmental weathering factors of the sealing barrier.

The second component may itself be a grouting composition. A preferred second component in the form of a second grouting composition is a polymeric latex whether natural or synthetic, for example a sealing composition comprising (a) a major proportion of a latex emulsion or colloid; and (b) a minor proportion of lauric acid or laurate compound; and (c) at least one further selected additive, for example a curing agent to cure or coagulate a polymeric emulsion or colloid. Natural rubber latex is a preferred latex emulsion or colloidal suspension. Such a second grouting composition may include a UV inhibitor whether a UV absorber, such as carbon black, or a hindered amine light stabiliser (HALS), if required and as may be expected given the susceptibility of untreated polymeric latexes to UV degradation. Anti-radiation compounds or additives could also be included in the polymeric latex, for example as described in the Applicant's co-pending International Application No. PCT/AU2018/050198 filed 5 Mar. 2018, the contents of which are hereby incorporated herein by reference. Corrosion inhibitors such as zinc phosphate could be included, if for example, the surface to be sealed is exposed to a corrosive environment, for example in a process vessel.

The third grouting composition may typically include any combination, and optionally a mixture, of the first and second grouting compositions as described above. Conveniently, the method may further include the following steps:
(d) directing the first grouting composition to the surface location; and
(e) directing the second grouting composition, desirably less susceptible to ultraviolet radiation than the first grouting composition where the sealing barrier is exposed to sunlight, to the surface location.

Steps (d) and (e) may be conducted in any sequence (i.e. (e) after (d) or (d) after (e)) or substantially simultaneously dependent on factors such as the surface location to be treated or engineering requirements for a specific coating or sealing barrier thickness to be achieved at a particular site. Either or both steps may be repeated to provide a layered sealing barrier. Curing of a layer of first or second grouting composition is not a pre-condition for applying a further grouting composition. Direction of first and second grouting compositions in uncured or partially cured state to intersect is desirable to cause mixing between the first and second grouting compositions to form the third grouting composition which can be a composite of the first and second grouting compositions and with enhanced sealing properties over either alone.

The first and second grouting compositions may be applied to the surface location in admixture with a ratio of the first and second grouting compositions controlled to achieve desired mechanical properties for the third grouting composition and sealing barrier such as compressive strength and elasticity which assist in resisting environmental weathering factors. Control over the ratio of first grouting composition to second grouting composition may also improve adhesion of the grouting compositions at the surface location as well as water permeability, it being evident that these characteristics also resist environmental weathering factors. It will be understood, however, that further surface treatments—for example painting—may be applied to still further improve resistance to weathering, such step would typically be done post curing of the third grouting composition.

The method may include at least one curing stage in which the grouting compositions become effective as sealants through hardening or setting for example. One or both of the grouting compositions may include an accelerator for accelerating setting and hardening if required. Such accelerators may be alkali metals or alkali free, for example being based on aluminium sulphate. A grouting composition may also act as curing agent or accelerator. In the case of a polymeric second grouting composition (e.g. latex based emulsion), the first grouting composition—for example in the form of ordinary Portland Cement (OPC)—may act as an accelerator, for example for a polymeric latex as described above. An accelerator (suitable to promote curing of either or both of the first and second grouting compositions) could also be included within the first grouting composition with potential benefits in terms of controlling curing and sealing barrier thickness. Such curing may also occur at the surface location. As a result, the grouting compositions may cure in a plurality of zones, e.g. as the grouting compositions mix and interact away from the surface location, at the surface location and, possibly, also within the apparatus described below. Where steps (d) and (e) are performed simultaneously, for example by spraying, curing of a polymeric second grouting composition may also occur within intersecting sprays of first and second grouting compositions as first and second grouting compositions mix and interact to form the third grouting composition. As the second grouting composition is likely to be in liquid form during delivery to the surface location, the spraying process may induce shear that promotes a degree of coagulation and curing, for example for latex based emulsions.

The grouting compositions may be applied by various methods. Conveniently, the grouting compositions may be applied to the surface location by spraying, coating or painting. It will be understood that these operations are not necessarily alternatives. The grouting compositions are most conveniently applied to the surface location under pressure, for example by spraying, for example through a 'Shotcrete' or other application method suitable for wet or uncured cements for the first grouting composition. In such case, a sprayable ready-mixed concrete or mortar comprising aggregate, cement and water may be delivered to the location through one or more nozzles in a wet spraying process. A dry spraying process may also be used. In this case, water is not included in the mix, rather dry concrete is mixed at the nozzle(s) with water and accelerators as described above and then applied to the surface location. Formwork is not required. Polymeric grouting compositions may also be applied by spraying. Spraying conveniently includes a propellant such as a liquid or gas, such as water or air, to entrain the grouting composition(s). A relatively low spray velocity may be selected to reduce propellant entrainment within a grouting composition, particularly the first grouting composition such as concrete, thus promoting the formation of a sufficiently dense and structurally sound sealing barrier. In any case, application methods are advantageously controlled to provide a sealing barrier that has sufficient thickness over the surface location to achieve the required mechanical properties and water permeability.

As alluded to above, the first and second grouting compositions may conveniently be applied in admixture. A composite of cement and polymeric latex when used as a sealing barrier potentially has good water resistance and good adhesion at the surface location as well as acceptable UV resistance, potentially even in the absence of a UV inhibitor (though inclusion is much preferred). Ratio of cement to polymeric latex can be controlled to control mechanical properties such as compressive strength, elasticity and adhesion.

In another aspect, the present invention provides an apparatus for sealing of surfaces comprising:
(a) a first delivery system for supplying a first grouting composition; and
(b) a second delivery system for introducing a second component to said first grouting composition to form a third grouting composition which is applied to a surface location for forming a sealing barrier from said third grouting composition.

The first and third grouting compositions, as well as the second component are desirably of nature as above described.

The first and second delivery systems, typically being mechanical systems, may operate independently of each other, though possibly under the control of a control unit. However, the first and second delivery systems may conveniently be connected, at least mechanically if not fluidly i.e. to mix the grouting compositions within the delivery systems, to enable the first and second grouting compositions (where the second component is a second grouting composition) to be delivered either sequentially or in admixture by an operator or autonomous machine. To this end, the first and second delivery systems may each comprise at least one compressor or pump for pumping grouting composition through a pipe or duct, for example a hose, to an outlet device, for application of the first, second or, less conveniently, third grouting composition (which could cure within the outlet device in the absence of inhibitors) to the surface location. Compressor(s) common for the first and second delivery systems may be used, particularly where the grouting compositions are admixed, for example using the same batching unit or system. The outlet device may be hand held. The outlet device desirably includes a nozzle for delivering each, or less preferably both, grouting composition(s) to the surface location. The nozzle(s) may include a gas or liquid injection device for entraining grouting composition in a propellant gas or liquid within a mixing chamber prior to application to the surface location. A suitable propellant gas includes air. A suitable propellant liquid includes water. The propellant may also form part of the first, second or third grouting composition. If the propellant is compressed air, a common air compressor may deliver compressed air to each of the nozzles within the apparatus.

BRIEF DESCRIPTION OF THE DRAWINGS

The method, apparatus and composition for sealing of surfaces according to the invention may be more fully understood from the following description of preferred but non-limiting embodiments thereof made with reference to the drawings (not to scale) in which.

DETAILED DESCRIPTION OF PREFERRED EMBODIMENTS OF THE INVENTION

Figure 1:
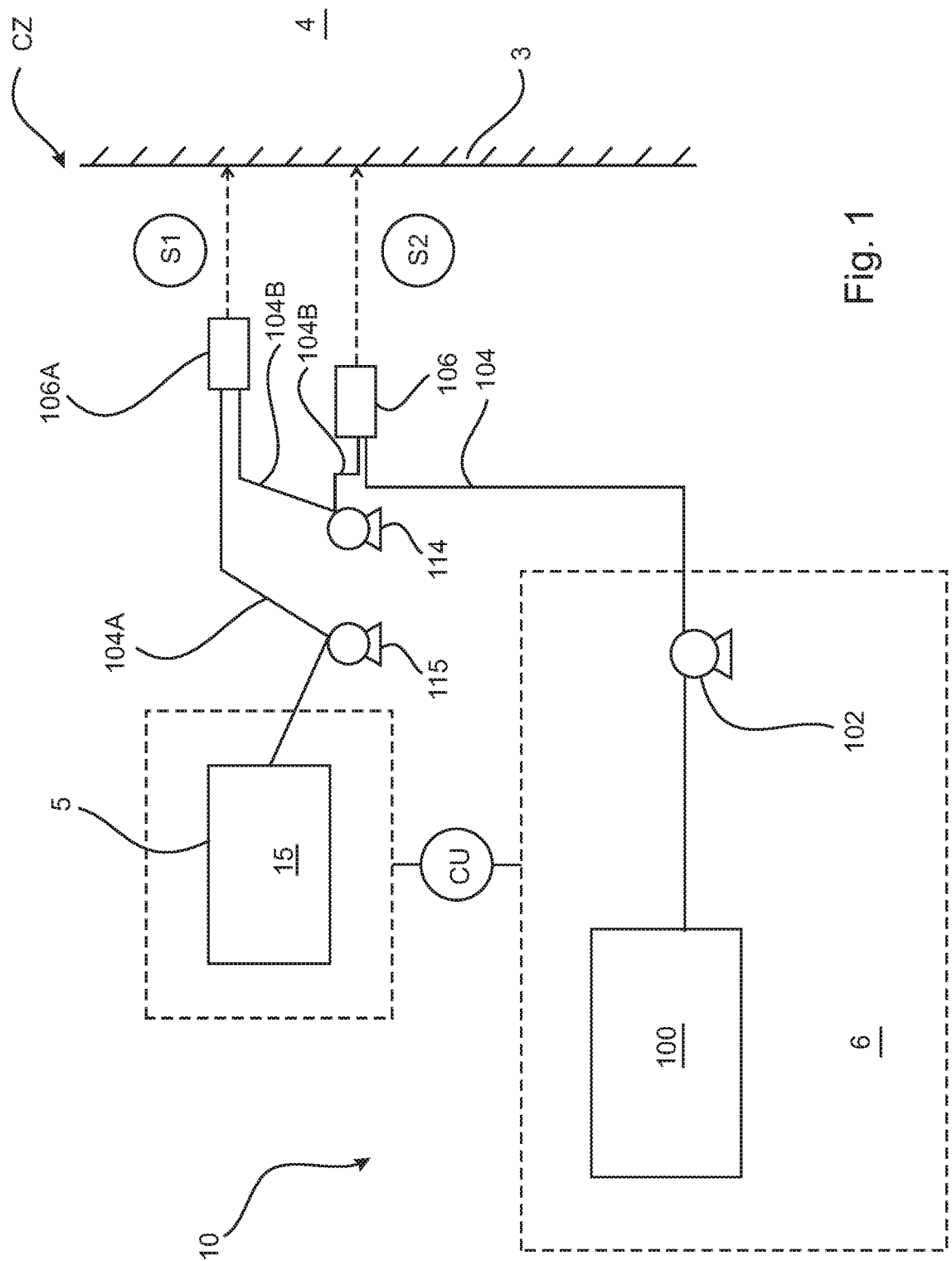
FIG. 1 is a schematic diagram of one embodiment of apparatus for conducting a first embodiment or mode of the method to seal a wall of a structure.
Figure 3:
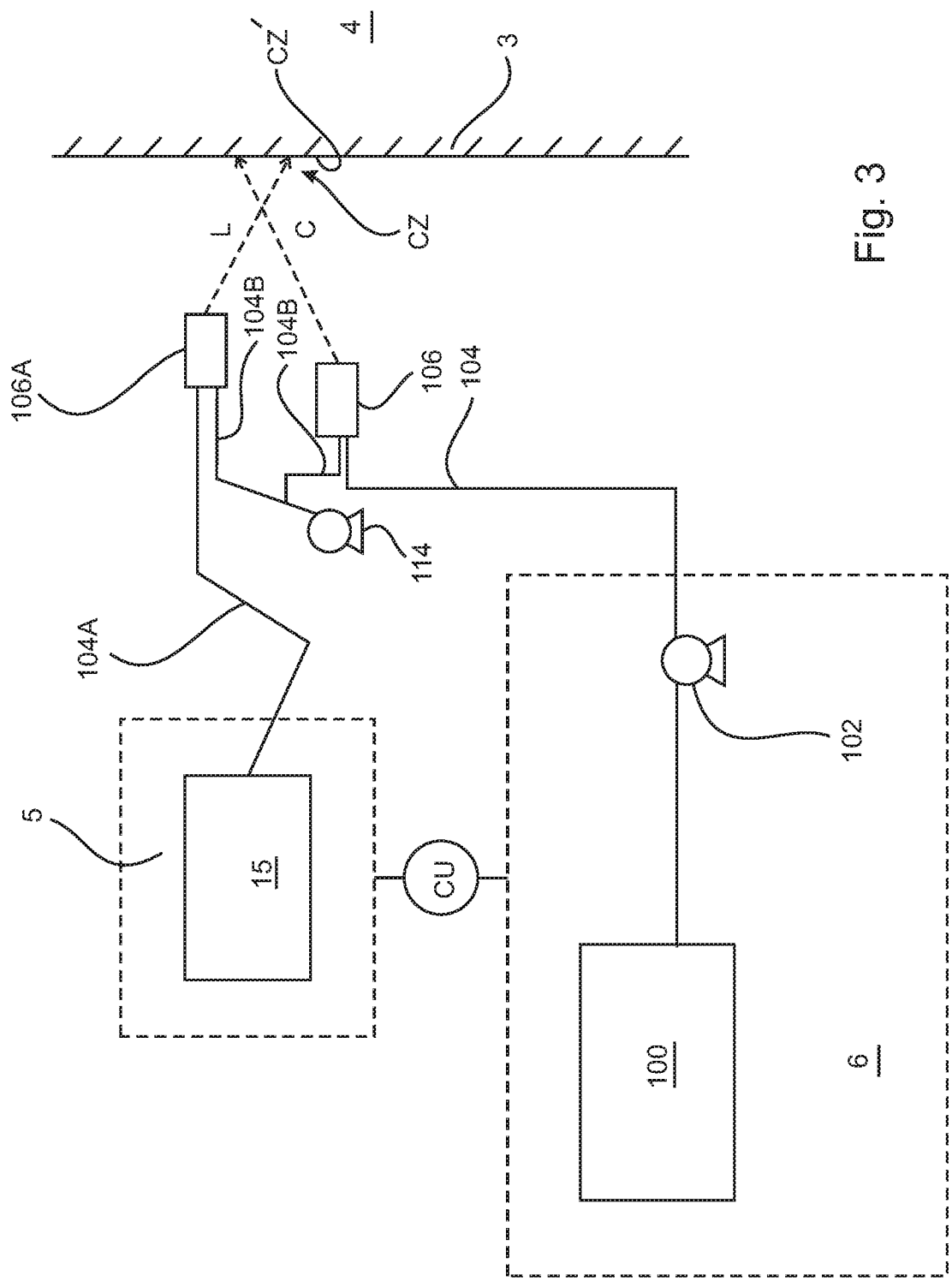
FIG. 3 is a schematic diagram of one embodiment of apparatus for conducting a second embodiment or mode of the method to seal a wall of a structure.

Referring now to FIGS. 1 and 3, there is shown an apparatus 10 for sealing a wall 3 of a structure 4 with a sealing barrier consisting of a combination of grouting compositions (third grouting composition) as described below. Wall 3 exposed to sunlight—requires waterproofing or repair through applying sealing compositions in the form of a first grouting composition and a second component in the form of a second grouting composition at a surface location 3 exposed to weather and, of course, sunlight and associated ultraviolet radiation. It will be understood that surfaces exposed to sunlight are not the only surfaces that can be sealed as described below. As one example, the surface could be a tubbing segment or the internal or external surface of a process vessel not exposed to sunlight.

The first grouting composition is cement based, such as concrete, and may therefore include sand and/or an aggregate material. Cement compositions and concrete are known in the art and further detailed description is not necessary here. Ordinary Portland Cement (OPC) is adopted as the cement here for ease of illustration.

The second grouting composition is in the form of a polymeric latex sealing composition comprising natural latex and additives as available from the Applicant and described in references such as Australian Patent Nos. 739427, 2009253842 or 2013266018 incorporated herein by reference. Suitable latex is supplied in emulsion or colloidal suspension with water. The latex emulsion used is, though a natural rubber latex, an industrial type such as is readily available from a number of sources in various grades. Latex emulsions of purity greater than 20%, more preferably 30% latex, even more preferably 50% by weight latex is suitable. A UV inhibitor or absorber, conveniently carbon black, is also included in the latex emulsion/suspension. The proportion of carbon black to latex emulsion may be less than 1% by weight of the latex emulsion. Other synthetic latexes or polymeric based emulsions may also be suitable.

Having described the first and second grouting compositions and noticing that the first and second grouting compositions combine in a manner to form a third grouting composition and at least part of the sealing barrier on wall surface 3, the two grouting composition delivery systems 5, 6 within apparatus 10 may be described. The following description is common to the apparatus 10 as shown in FIGS. 1 and 3.

The latex emulsion delivery system 5 supplies latex sealing composition (second grouting composition) prepared, for example as described in the Applicant's earlier patent references incorporated herein, within latex preparation stage 15 and above. The latex emulsion is pumped by a diaphragm pump 115 from latex preparation stage 15 through a hose 104A, with a viscosity enabling spraying, through an outlet device 106A including a nozzle 110A (referencing FIG. 5) towards the wall surface 3. Viscosity is controlled by controlling the proportion of water in the latex emulsion. The latex delivery system 5 operates at relatively low pressure, significantly lower pressure than required for sealing leaks in mining applications as described in the Applicant's U.S. Pat. No. 9,027,930, the contents of which are hereby incorporated herein by reference. Lower pressure is possible because there is no requirement for pumping latex potentially significant distances through the narrow cracks and fissures that are common in geological formations.

The concrete delivery system 6 supplies concrete, such as OPC based concrete, prepared by methods known in the art with two delivery options being available: wet shotcrete and dry shotcrete.

The 'wet shotcrete' option for concrete delivery system 6 involves conventional concrete batching with the concrete/cement being discharged from a cement mixer 100 into a concrete pump 102 of concrete delivery system 6. Cement mixer 100 and concrete pump 102 are of conventional type. OPC based concrete is then pumped by concrete pump 102 through a flexible rubber concrete hose 104 to an outlet device in the form of a hand held or machine mounted spray nozzle 106. If rapid concrete hardening is desirable, the concrete composition includes a suitable accelerator for this purpose, such as an aluminium sulphate accelerator, for example as described in WO 2017/001413 (Sika Technology AG), the contents of which are hereby incorporated herein by reference.

Alternatively, concrete delivery system 6 may enable a 'dry shotcrete' or 'gunite' option which would avoid mixing of the cement with water until it reaches the spray nozzle 106. The concrete batching process is conducted dry without involving mixing with water. A shotcrete accelerator, as described above, may be included in the dry concrete mix as before to accelerate the curing process.

Apparatus 10 may make a mechanical connection between the hoses 104 and 104A and their associated outlet devices in the form of spray nozzles 106 and 106A so that the operator may spray either or both latex emulsion and concrete towards the wall surface 3 of structure 4 for sealing purposes without going back and forth between delivery systems 5 and 6. This saves time and potentially enables the formation of a more resilient sealing barrier.

Figure 5:
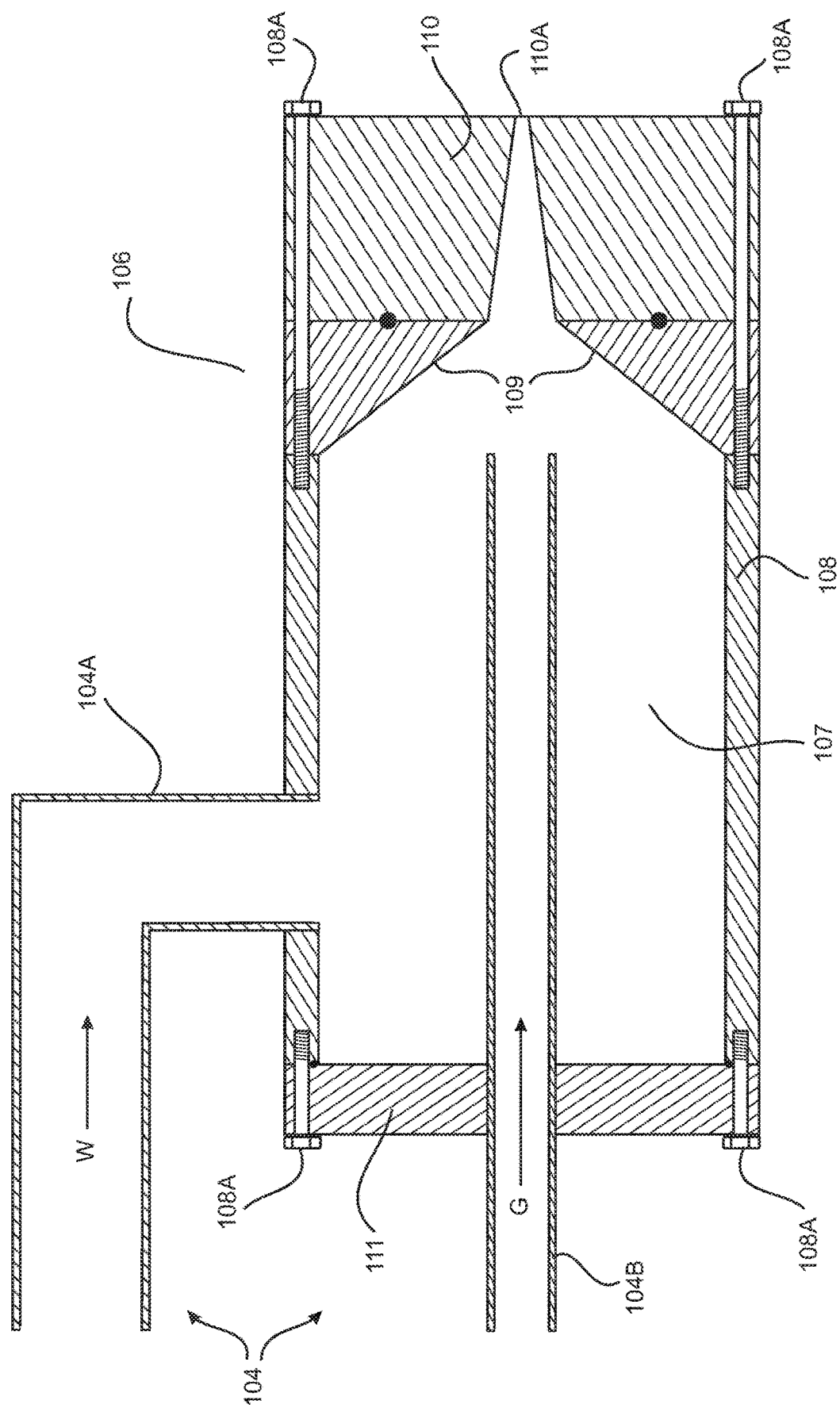
FIG. 5 is a schematic diagram of an outlet device in the form of a nozzle suitable for inclusion as delivery means in the apparatus schematically shown in FIGS. 1 and 3.

Referring to FIG. 5, the spray nozzles 106 and 106A have the same construction with the propellant for entraining concrete (wet 'shotcrete' option: water could be used for the concrete delivery nozzle if a dry 'shotcrete' option is preferred) and latex emulsion being compressed air supplied by a common air compressor 114. Each nozzle 106, 106A has a substantially cylindrical housing 108 with a removable nozzle body 110 and removable closure 111 connected to the housing 108 by bolts 108A. This allows easier maintenance and replacement, particularly of nozzle body 110, as such components wear with time. Housing 108 also includes a mixing chamber 107 communicating with the air compressor 114 through duct 104B and the latex emulsion delivery system or concrete delivery system, depending on the nozzle of interest, through duct 104A. Confluence of the compressed air and respective grouting composition creates turbulence and a high degree of mixing and substantially uniform entrainment in compressed air, particularly given the relative disposition of the angled surfaces 109 of the nozzle body 110 and the outlet of duct 104B. The relatively small area of the nozzle 110A also ensures that the respective grout is directed and delivered as a relatively high pressure spray towards wall surface 3.

Apparatus 10 may be operated in two modes for forming a UV resistant and protective sealing barrier on wall 3. Referring back to FIG. 1, latex emulsion (with UV inhibitor) is directed through hose 104A and nozzle 106A towards wall surface 3 in an initial sealing step S1. Concrete is not directed to wall surface 3 at this time. Turbulent mixing of latex emulsion and compressed air within nozzle 106A may enable a degree of curing of latex emulsion through shear. However, this may be found insufficient in which case an activator or accelerator may be included within the latex emulsion, for example a polyol as described in Australian Patent No. 2013266018 incorporated herein by reference, to enable curing on the wall surface 3 as a flexible and water impermeable sealing membrane 1 which adheres to the wall surface 3.

Curing of the latex membrane 1 takes a period of time. Concrete is directed through hose 104 and nozzle 106 towards wall surface 3 in a second sealing step S2 prior to completion of curing of latex membrane 1. Concrete may also be directed towards wall 3 after curing of the latex membrane 1. Concrete may also be sprayed at controlled pressure so as to minimise, or preferably avoid, damage to the latex membrane 1. A relatively low spray velocity also reduces air entrainment within the concrete and promotes the formation of a sufficiently dense and structurally sound sealing layer on wall surface 3. The relative timing of sealing steps S1 and S2 may be controlled by the operator or by a control unit CU where applying of grouting compositions is conducted autonomously. Steps S1 and S2 may be repeated if required.

Curing, in this first mode of operation, occurs substantially at the wall surface 3 in a sealing zone CZ whether due to the polyol curing agent or, in some degree, due to interaction with the OPC concrete which also has a curative effect. As alluded to above, the OPC based concrete may itself form a role in accelerating curing and it is possible for the latex emulsion to avoid inclusion of an activator or curing agent in favour of using the concrete curing mechanism. The activator for the latex emulsion could also be included within the OPC concrete with potential benefits in terms of controlling curing and sealing barrier thickness.

Figure 2:
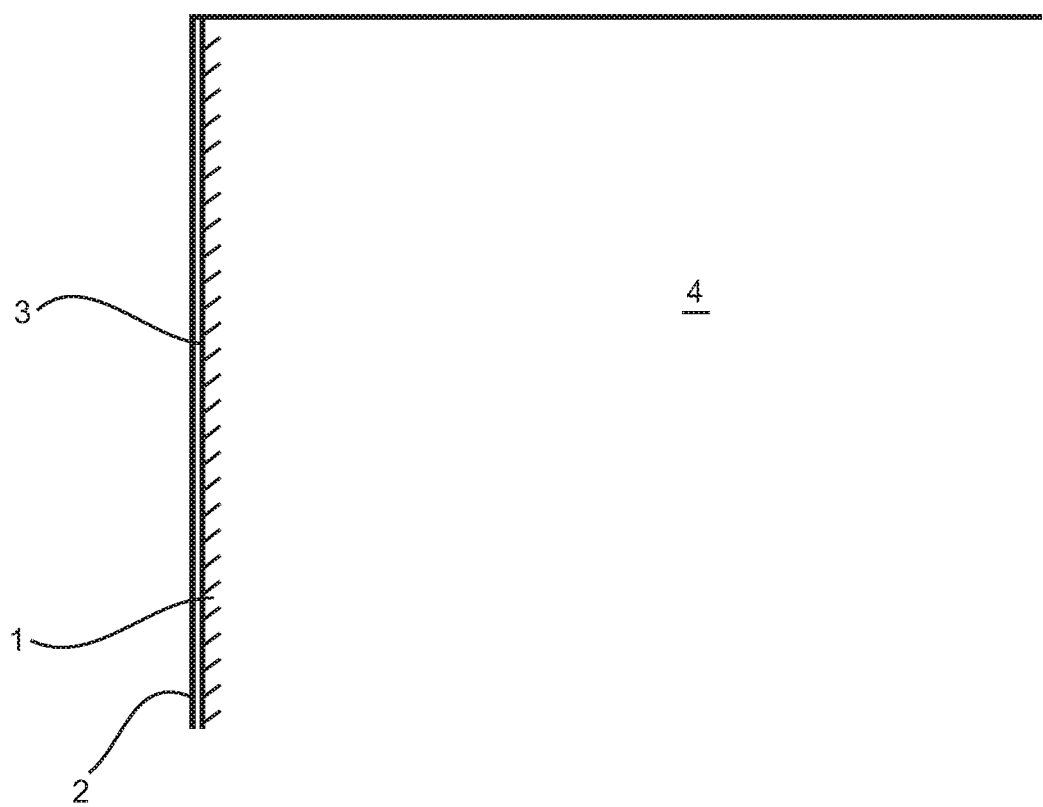
FIG. 2 is a schematic diagram of a protective sealing barrier formed on a wall of a structure by the apparatus of FIG. 1 according to the first embodiment or mode of the method of the invention.

A sealing barrier formed in this first mode has more or less distinct sealing layers comprised of the membrane 1 and the over-layer 2 of concrete as shown in FIG. 2. Such concrete over-layer 2 provides a degree of protection of the latex membrane 1 from UV radiation. However, as the latex layer will, to some degree, combine with the concrete over-layer 2, the UV inhibitor—in the form of the UV absorber carbon black—remains important. This sealing barrier is protective of wall surface 3 from weathering and has advantages in terms of improved adhesion of the concrete over-layer 2 to the wall surface 3 through the flexible latex membrane 1. The sealing barrier is water resistant and is also resistant to contraction/expansion behaviour through membrane 1 allowing flexing of the concrete so a lower degree of cracking of concrete over-layer 2 is expected than for a concrete protective layer alone. Water may be applied to over-layer 2 if required during the concrete curing process.

Referring to FIG. 3, there is described a second mode for sealing wall 3 of structure 4. The same apparatus 10 is used and latex emulsion (with UV inhibitor) is directed through hose 104A and nozzle 106A towards wall surface 3.

Concrete is also directed through hose 104 and nozzle 106 towards wall surface 3. Differently to the first mode of operation, OPC based concrete is directed towards the wall at the same time as latex emulsion is directed towards the wall surface 3. Nozzles 106 and 106A are also directed to deliver streams of concrete and latex L and C such that these streams intersect and cause mixing and interaction of the concrete and latex emulsion. Control unit CU controls the duration of the spraying of latex and concrete to create a suitable protective sealing barrier but also to avoid wastage of sealing material. It is to be understood that concrete and latex emulsion could also be sprayed in any order as well as simultaneously as described here. This would depend on factors such as the nature of the wall surface 3 to be treated and engineering requirements for a specific coating or sealing barrier thickness at a specific site.

Curing, in this second mode of operation, occurs to appreciable extent within the air gap between wall surface 3 and apparatus 10 in a sealing zone CZ where the concrete itself acts as an accelerator to cure the latex emulsion as the two grouting compositions mix and interact. The concrete also commences curing at this stage though its curing duration is expected to be longer than for latex emulsion. As alluded to above, the OPC based concrete itself forms a role in curing and it is possible for the latex emulsion (or concrete for that matter) to avoid inclusion of an activator or curing agent in favour of using the OPC based concrete curing mechanism. A degree of curing for both concrete and latex emulsion also occurs in a curing zone CZ' at the surface of wall surface 3. Some curing of the latex emulsion may also occur, due to shear, in nozzle 106A.

Figure 4:
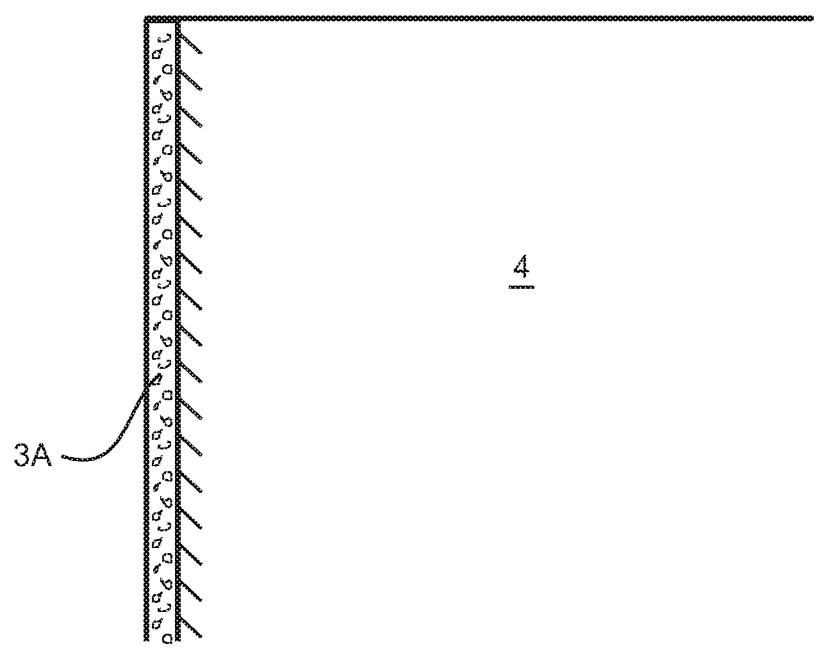
FIG. 4 is a schematic diagram of a protective sealing barrier formed on a wall of a structure by the apparatus of FIG. 3 according to the second embodiment or mode of the method of the invention.

A sealing barrier formed in this second mode is a composite sealing layer 3A comprised of the concrete and latex emulsion combination (third grouting composition) as schematically shown in FIG. 4, providing the mechanical properties of OPC concrete with the improved adhesion and flexibility derived from the cured elastic latex. For this mode, inclusion of the UV inhibitor—in the form of a UV absorber carbon black—is particularly important as the polymeric portion is exposed to UV radiation, without the OPC concrete necessarily forming a protective overlayer as with the first mode of sealing. As before, the sealing barrier 3A is protective and has advantages in terms of improved adhesion of the concrete portion to the wall surface 3. Such sealing barrier 3A is also water resistant and resistant to contraction/expansion behaviour so a lower degree of cracking of concrete is expected than for a concrete protective layer alone.

Modifications and variations to the method, apparatus and composition for sealing of surfaces described in this specification may be apparent to the skilled reader of this disclosure. Such modifications and variations are deemed within the scope of the present invention.

The invention claimed is:

1. A method for sealing of surfaces comprising the steps of:
   (a) supplying a first grouting composition being a curable mineral based grout in combination with water to a surface location;
   (b) supplying a second grouting composition being a curable polymer based emulsion grout propelled in liquid form to the surface location, said polymer based emulsion grout being a polymeric latex sealing composition comprising (i) a major proportion of a latex emulsion or colloid; (ii) a minor proportion of lauric acid or laurate compound; (iii) water; (iv) a UV inhibitor; and (v) at least one further selected additive selected from the group consisting of a curing agent, a corrosion inhibitor and an anti-radiation compound; and
   (c) forming a sealing barrier on the surface location from a combination of said first and second grouting compositions, said combination being formed at the surface location as a result of steps (a) and (b);
   wherein said sealing barrier is a water resistant barrier resistant to UV radiation;
   wherein the first and second grouting compositions are propelled under controlled pressure to the surface location, with a ratio of the first and second curable grouting compositions being controlled to achieve target mechanical properties for the sealing barrier, said target mechanical properties of the sealing barrier being elasticity and adhesion properties;
   wherein, on selection of a first available mode of sealing, steps (a) and (b) are conducted simultaneously with streams of first and second grouting compositions intersecting in a space proximate the surface location, the second grouting composition being at least partially cured by the mechanisms of 1) shear during supply of the second grouting composition; and 2) said first grouting composition acting to cure the second grouting composition at a distance from the surface location, a curing agent being included within said second grouting composition where curing mechanisms 1) and 2) are insufficient to complete curing of the second grouting composition in said first available mode of sealing;
   wherein, on selection of a second available mode of sealing, steps (a) and (b) are conducted separately to form a layered sealing barrier, the second grouting composition being at least partially cured by the mechanisms of 1) shear during supply of the second grouting composition; and 2) said first grouting composition acting to partially cure the second grouting composition at the surface location, a curing agent being included within said second grouting composition where curing mechanisms 1) and 2) are insufficient to complete curing of the second grouting composition in said second available mode of sealing; and wherein the first or the second available mode of sealing is selected.

2. The method of claim 1, wherein said first grouting composition is selected from the group consisting of grouts with less flexibility than polymeric latexes, said grout being selected from the group consisting of: sodium silicate, cement and cementitious compositions.

3. The method of claim 1, wherein the UV inhibitor is selected from the group consisting of a UV absorber and a hindered light stabilizer (HALS).

4. The method of claim 3, wherein the UV inhibitor is carbon black.

5. The method of claim 1, wherein steps (a) and (b) are conducted simultaneously in said first available mode of sealing dependent on at least one factor selected from the group consisting of: the surface location to be treated, engineering requirements for a specific coating and sealing barrier thickness to be achieved at a particular site; and wherein the first curable grouting composition substantially cures the second curable grouting composition.

6. A method for sealing of surfaces comprising the steps of:
   (a) supplying a first curable grouting composition;
   (b) supplying a second curable grouting composition being a polymer based emulsion grout in liquid form;
   (c) directing the first grouting composition to a surface location;
   (d) directing the second grouting composition to the surface location; and
   (e) forming a sealing barrier on the surface location from a combination of said first and second grouting compositions, said combination being formed at the surface location as a result of steps (c) and (d);
   wherein said first grouting composition is selected from the group consisting of grouts with less flexibility than polymeric latexes, said grout being selected from the group consisting of: sodium silicate, mineral, cement and cementitious compositions; and
   wherein said first and second grouting compositions in uncured or partially cured state are supplied simultaneously and directed to intersect in a space proximate the surface location to cause mixing between the first and second curable grouting compositions;
   wherein said sealing barrier is a water resistant barrier resistant to UV radiation;
   wherein the first and second grouting compositions are propelled under pressure to the surface location in admixture, with a ratio of the first and second curable grouting compositions being controlled to achieve target mechanical properties for the sealing barrier, said target mechanical properties of the sealing barrier being elasticity and adhesion properties;
   wherein supplying said second grouting composition step (b) includes turbulent mixing, in a mixing chamber, of the second grouting composition and gas as a propellant for the second grouting composition to induce partial curing of said second grouting composition by shear; and wherein the first curable grouting composition acts, during mixing of the first and second grouting compositions, to cure a remaining uncured portion of the partially cured second curable grouting composition.

7. The method of claim 6, wherein the ratio of first grouting composition to second grouting composition is controlled together with viscosity of the second grouting composition to improve adhesion of the combination of grouting compositions at the surface location as well as water permeability.

8. The method of claim 7, wherein at least one of the first or second grouting compositions includes an accelerator for accelerating setting and hardening.

9. The method of claim 6, wherein said first and second grouting compositions in uncured or partially cured state are directed to intersect in the air at a determined angle.

10. The method of claim 6, wherein said first grouting composition is sprayed at controlled pressure with propellant air, reducing air entrainment from the propellant air within the sprayed first grouting composition when forming the sealing barrier.

11. A method for sealing of surfaces comprising the steps of:
   (a) supplying a first curable grouting composition;
   (b) supplying a second curable grouting composition being a polymer based emulsion in liquid form, said polymer based emulsion being a polymeric latex sealing composition comprising (i) a major proportion of a latex emulsion or colloid; (ii) a minor proportion of lauric acid or laurate compound; (iii) water; and (iv) a UV inhibitor, a viscosity of said second curable grouting composition being controlled by controlling the proportion of water in the second grouting composition;
   (c) directing the first grouting composition to a surface location;
   (d) directing the second grouting composition to the surface location; and
   (e) forming a sealing barrier on the surface location from a combination of said first and second grouting compositions, said mixture being formed at the surface location as a result of steps (c) and (d);

wherein said first grouting composition is selected from the group consisting of grouts with less flexibility than polymeric latexes, said grout being selected from the group consisting of: sodium silicate, mineral, cement and cementitious compositions;

wherein the first and second grouting compositions are propelled under pressure to the surface location with a ratio of the first and second curable grouting compositions being controlled to achieve target mechanical properties for the sealing barrier, said target mechanical properties of the sealing barrier being elasticity and adhesion properties;

wherein supplying said second grouting composition (step (b)) includes turbulent mixing, in a mixing chamber, of the second grouting composition and air as a propellant for the second grouting composition to induce partial curing of said second grouting composition by shear;

wherein said first and second grouting compositions in uncured or partially cured state are directed to intersect in the air to cause mixing between the first and second curable grouting compositions, said mixing causing the first grouting composition to cure a remaining uncured portion of the second grouting composition.

12. The method of claim 11, wherein the polymeric latex sealing composition contains 20% to 50% by weight latex.

13. The method of claim 12, wherein the polymeric latex sealing composition contains 1% by weight carbon black as the UV inhibitor.

* * * * *